United States Patent van Daele et al.

[11] Patent Number: 5,497,730
[45] Date of Patent: Mar. 12, 1996

[54] FEEDING DEVICE FOR POULTRY

[75] Inventors: Antoine A. van Daele; Jean-Paul A. P. Martens, both of Eeklo, Belgium

[73] Assignee: Roxell, N.V., Maldegem, Belgium

[21] Appl. No.: 250,597

[22] Filed: May 27, 1994

[30] Foreign Application Priority Data

May 28, 1993 [NL] Netherlands ............................ 9300921

[51] Int. Cl.$^6$ .................................................. A01K 39/01
[52] U.S. Cl. ............................................ 119/53; 119/57.4
[58] Field of Search ......................... 119/52.1, 53, 56.1, 119/57.4, 72, 74

[56] References Cited

U.S. PATENT DOCUMENTS

| | | | |
|---|---|---|---|
| 3,476,087 | 11/1969 | Scott et al. | 119/57.4 |
| 5,007,380 | 4/1991 | Badia et al. | 119/53 |
| 5,101,766 | 4/1992 | Runion | 119/53 |
| 5,311,839 | 5/1994 | Pollock et al. | 119/53 |

FOREIGN PATENT DOCUMENTS

| | | |
|---|---|---|
| 0421553 | 4/1991 | European Pat. Off. |
| 1426651 | 3/1976 | United Kingdom . |

*Primary Examiner*—Robert P. Swiatek
*Attorney, Agent, or Firm*—Deveau, Colton & Marquis

[57] ABSTRACT

A feeding device for poultry has a dish-shaped pan, above which a feed drop tube is centrally arranged. The upper end of the feed drop tube can be brought in open connection with a feed supply tube of a feed supply system. Between the feed drop tube and the pan a plurality of support arms is present which are connected to a rim of the pan by means of a snap connection with two transverse arms extending along the rim of the pan and having hook lugs and a supporting lip. The feeding device is connected to the feed supply tube by two yoke parts which, together, enclose the feed supply tube, the first yoke part having two yoke arms with hook parts directed towards each other for enclosing the second yoke part.

11 Claims, 4 Drawing Sheets

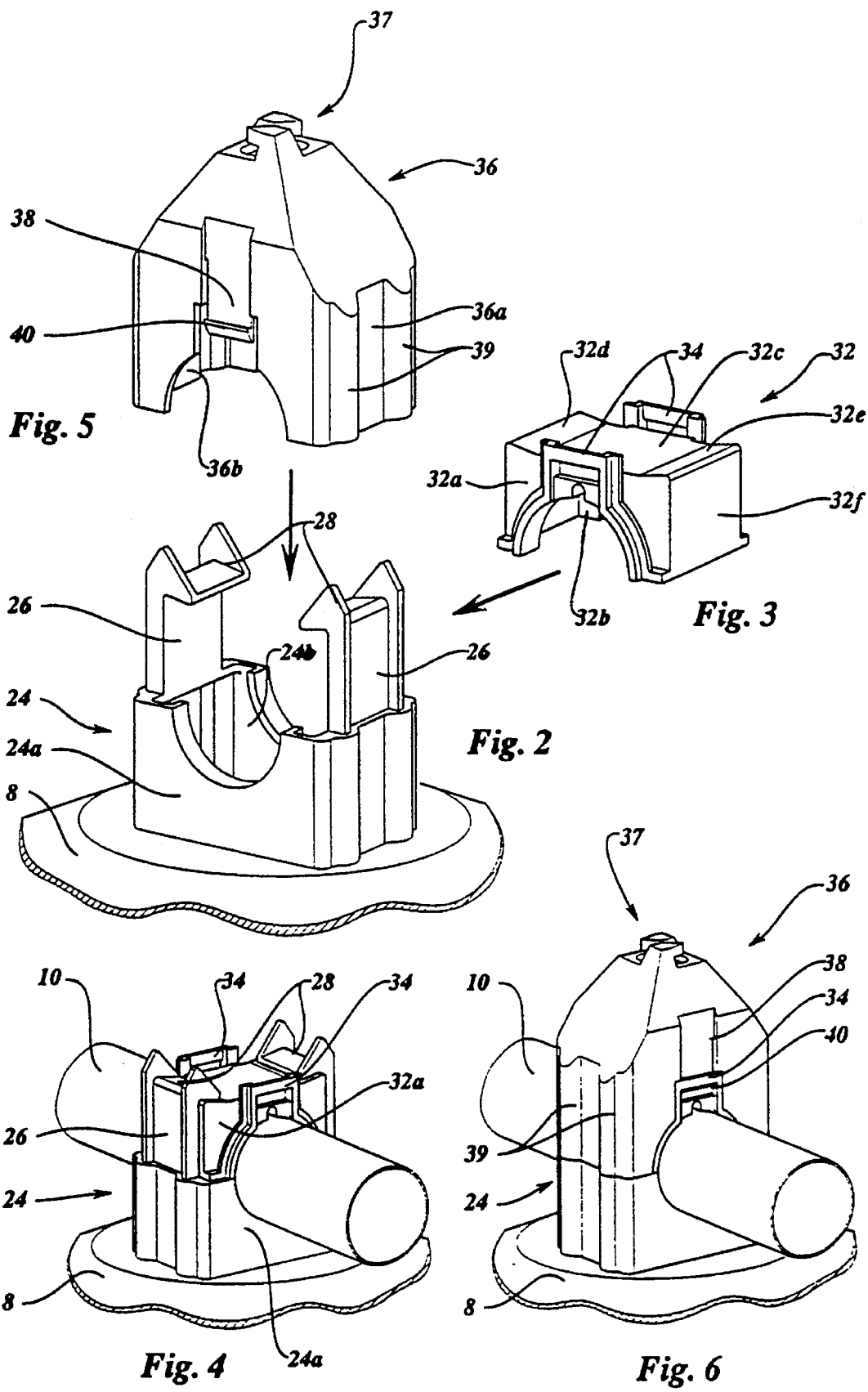

FEEDING DEVICE FOR POULTRY

BACKGROUND OF THE INVENTION

This invention relates to a feeding device for poultry, in particular turkeys, comprising: a substantially dish-shaped pan, a feed drop tube arranged centrally above the pan and having a vertically directed centre line, the upper end of the feed drop tube being adapted to be in open connection with a horizontal feed supply tube of a feed supply system, and the lower end thereof being open and extending above the pan; and connecting means for connecting the pan with the feed supply tube, which connecting means comprise support arms extending to the pan.

DISCUSSION OF THE PRIOR ART

A feeding device of the type described above is, for example, known from GB-A 1 426 651, and is generally used for feeding poultry during a time period during which the animals become larger, heavier and stronger. For young animals the feeding device connected with the feed supply tube of the feed supply system is arranged on the ground for a good accessibility of the feed, and the feeding device will in the course of time, when the animals have grown sufficiently, be suspended from the feed supply tube above the ground. During feeding the birds being present around a feeding device will exert forces on the feeding device, which forces will be larger as the weight and strength of the birds increase, which forces should be taken up by the device. In particular the connection between the feeding device and the feed supply tube and between the pan and the remaining part of the feeding device will be exposed to risks. When the feeding device is suspended above the ground, the first-mentioned connection is, moreover, exposed to wear by the oscillating movement of the device around the feed supply tube of the feeding system. Very heavily loaded feeding devices of the above-mentioned kind, such as feeding devices for turkeys, have therefore, in the past, been constructed mainly from metal. Metallic feeding devices, however, have the objection that they have a large intrinsic weight, so that the over-all feeding system should be made heavy, and furthermore corrosion will occur, so that the feeding devices have a restricted life.

SUMMARY OF THE INVENTION

It is an object of the invention to provide a feeding device in which the above-mentioned objections have been reduced, which device can be made wholly or substantially of plastics, and is sufficiently strong for withstanding the forces exerted thereon by heavy birds such as turkeys.

The device according to the invention is, therefore, characterised in that the support arms at their ends directed towards the pan, are provided with two transverse arms extending in opposite directions, the transverse arms being provided with hook lugs gripping around a rim of the pan at one side of the wall of the pan the support arm or transverse arms at the other side of the wall of the pan carrying at least one supporting lip bearing against the pan. Thus, the wall of the pan is, enclosed between the transverse arms and hook lugs and the supporting lip. The strong connection obtained can, in use, not get loose from the feeding device as a consequence of the normal forces exerted thereon, even by heavy birds, and even if the arms are made of plastics.

Preferably the hook lugs are situated at the outer side of the wall of the pan. Since the forces exerted on the support arms of the feeding device are mainly directed towards the center of the feeding device, said arrangement of the hook lugs provides a strong connection between a support arm and the pan.

To avoid a displacement of the connection between a support arm and the pan along the rim of the pan, preferably at least one supporting lip extends through a hole in the pan.

For a cleaning of the feeding device without removing it from the feed supply tube, it is preferred that a hinge connection between one arm and the pan can be made in any suitable way. For this purpose at least one of the supporting lips extending through a hole in the pan is flexible and can be bent in a direction at right angles to the wall of the pan.

In order to facilitate said hinge connection, in a preferred embodiment the wall of the pan in the area of at least one transverse arm is provided with a hole. A strip or the like can be put through the hole and closed around one of the transverse arms.

Said strip is fixed better by providing the transverse arm in the area next to the hole and facing away from the corresponding support arm and from the pan with a projection.

In a further preferred embodiment the connecting means comprise: a first yoke part having, at one side, a shape which is adapted to the shape of the feed supply tube, and having two yoke arms extending at both sides of the feed supply tube and substantially perpendicularly thereto, which yoke arms, at their free ends, are provided with hook parts directed towards each other; and a second yoke part having, at one side, a shape which is adapted to the shape of the feed supply tube, the hook parts of the first yoke part being adapted to grip behind one side of the second yoke part remote from the feed supply tube when the feed supply tube is inserted between both yoke parts. With these measures a strong connection between the over-all feed supply device and in particular the pan and the feed supply tube, is obtained, which connection can be made of plastics, and is, therefore, not sensitive to corrosion.

Selectively the first yoke part or the second yoke part may be a part of the feed supply device, the other yoke part then being a separate element. The separate yoke part is situated in a feeding device included in a feeding system at the upper side of the feed supply tube of the feeding system, and is, therefore, most susceptible to wear. This part, however, can be made of a very wear resistant plastics material such as polyamide, the higher price of the raw material in comparison to the lower price of the plastics material for the remaining part of the feed supply device, such as polypropene, is hardly objectionable. Since the second yoke part has the simplest shape and can be the least voluminous, it is advantageous if the first yoke part forms a part of the feeding device, the second yoke part being a separate element.

In a preferred embodiment the yoke arms of the first yoke part are mutually substantially parallel, so that, for manufacturing this yoke part from plastics, a relatively simple die can be used.

Preferably each yoke arm and the associated hook part include an angle which is smaller than 90°. It is, then, impossible that the arms will bend laterally under a mechanical load on the feeding device.

The claims and advantages will be more readily appreciated as the same becomes better understood by reference to the following detailed description and considered in connection with the accompanying drawings in which like reference symbols designate like parts.

BRIEF DESCRIPTION OF THE DRAWINGS

FIG. 2 is a view in perspective of a yoke part at the upper side of the feeding device;

FIG. 3 is a view in perspective of another yoke part intended to be used in combination with the yoke part of FIG. 2 for fixing the feeding device to a feed supply tube of a feed supply system;

FIG. 4 is a view in perspective at a small scale of the upper side of the feeding device for illustrating the use of the yoke parts of FIGS. 2 and 3;

FIG. 5 is a view in perspective of a covering cap;

FIG. 6 is a view in perspective at a smaller scale of the upper side of the feeding device, illustrating the use of the yoke parts of FIGS. 2 and 3 and the covering cap of FIG. 5;

DESCRIPTION OF THE PREFERRED EMBODIMENTS

Figure 1:
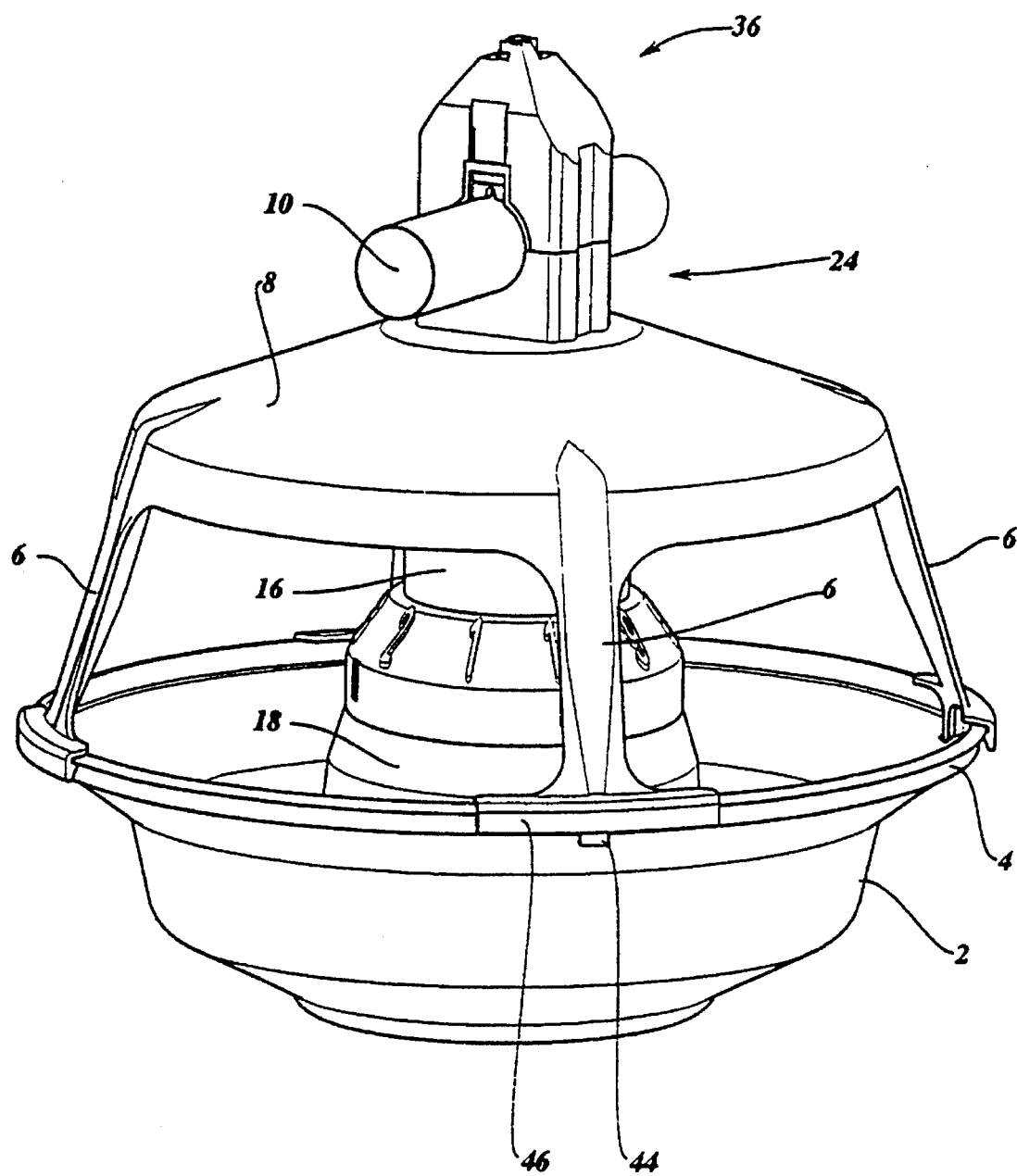
FIG. 1 is a view in perspective of a feeding device according to the invention.
Figure 7:
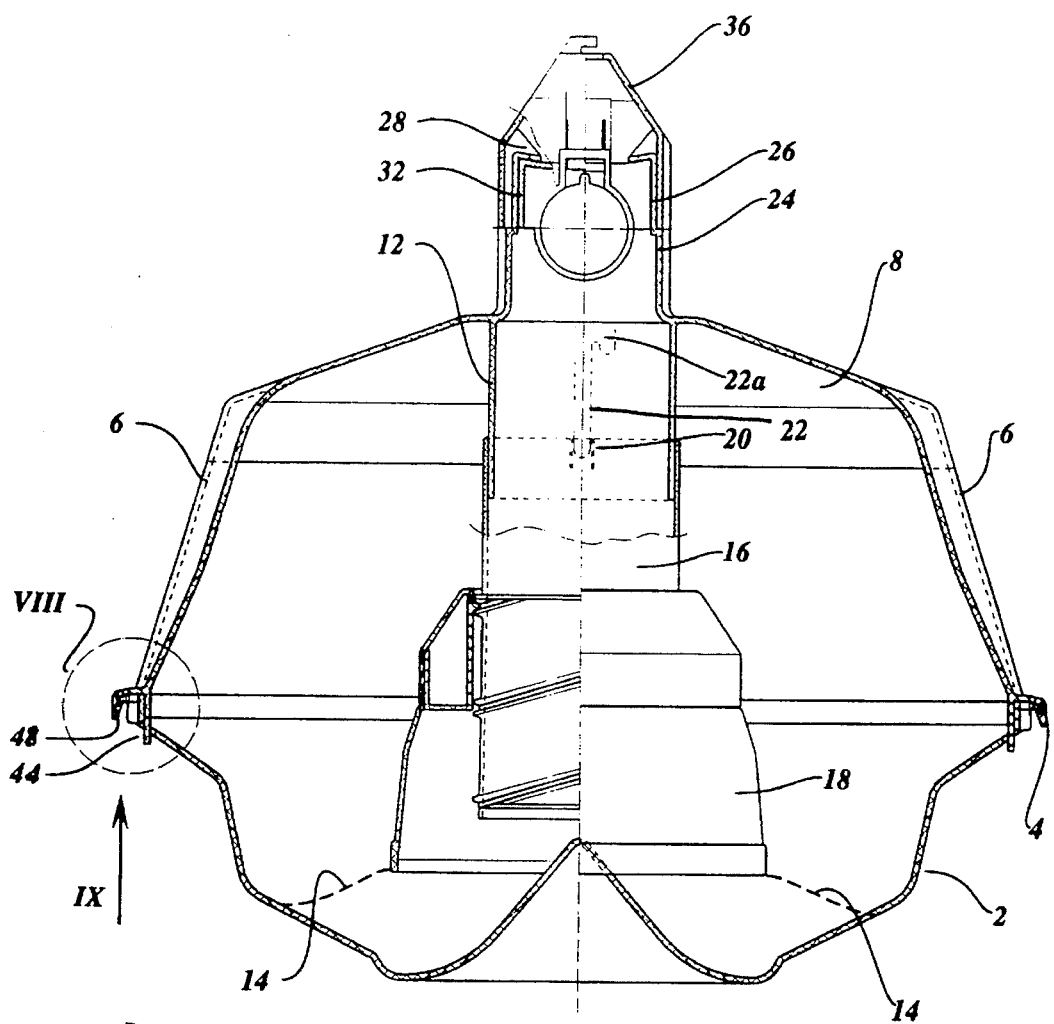
FIG. 7 is a partial cross-section of the feeding device of FIG. 1.

FIGS. 1 and 7 show a substantially dish-shaped pan 2 with a circumferential rim 4. On the circumferential rim 4 of the pan 2 the ends of support arms 6 are fixed by means of a snap connection to be elucidated below by reference to FIGS. 8 and 9, the other ends thereof being connected to a substantially conical body part 8. The body part 8 is, as will be elucidated below by reference to FIGS. 2–6, connected to a feed supply tube 10 of a feed supply system, and the central portion thereof is provided with a feed drop tube 12 which is in open connection with the feed supply tube 10. The feed supplied via the feed supply tube 10 to the feed drop tube 12 drops into the central portion of the pan 2, which portion is upwardly conically shaped for distribution of the feed over the bottom of the pan 2. The height of the feed in the pan 2 thus obtained is shown in FIG. 7 by the interrupted line 14, and is substantially determined by the position of the combination of a feed drop tube extension 16 and a feed drop tube end part 18 relative to the feed drop tube 12. The feed drop tube extension 16 is slidable in respect of the feed drop tube 12, and the feed drop tube end part 18 can preferably be shifted and adjusted by means of a screw connection therewith. The feed drop tube extension 16 is, near its upper rim, provided with an inwardly extending lug or tooth 20 which is inserted into a J-shaped groove 22 at the outer side of the feed drop tube 12. In the situation shown in FIG. 7, the tooth 20 is situated at the lower end of the longer section of the groove 22, and, by shifting upwardly the feed drop tube extension 16 along the feed drop tube 12, the tooth 20 can be brought into the shorter section of the groove 22 in a point indicated at 22a. In this manner the feed drop tube extension 16 can be brought into a lower and higher position respectively by means of the tooth/groove combination 20, 22. By rotating the feed drop tube end part 18 in respect of the feed drop tube extension 16, the position of the end part 18 above the bottom of the pan 2 can be additionally adjusted. This can be done step-wise, and to that end the feed drop tube end part 18 is provided, at its outer side, with a digital marking by means of which, in cooperation with a mark on the feed drop tube extension 16 and depending on the pitch of said screw connection, a position of the feed drop tube end part 18 in respect of the feed drop tube extension 16 can be adjusted step-wise. Additionally, an extra high position of the feed drop tube end part 18 above the bottom of the pan 2 can be adjusted by means of the tooth/groove combination 20, 22, leading to a high level 14 of the feed in the pan 2. The possibility of adjusting such a high feed level is, in particular, intended for young animals, so that they easily find the feed.

FIG. 2 shows a yoke part 24 provided at the upper side of the body part 8 of the feeding device, which yoke part defines an open hollow space which, at the lower side of the yoke part 24, merges with the space defined by the feed drop tube 12. Walls 24a and 24b of the yoke part 24 are each provided with semi-circular recesses having a diameter which is adapted to the outer diameter of the feed supply tube 10. The yoke part 24 is, moreover, provided with two oppositely arranged yoke arms 26 having ends remote from the yoke part 24 which are provided with hook parts 28 directed towards one another. The angle included by an arm 26 and an associated hook part 28 is smaller than 90°.

FIG. 3 shows another yoke part 32 with walls 32a and 32b in which semi-circular redesses are provided having a diameter which corresponds to the outer diameter of the feed supply tube 10. The wall 32c of the yoke part 32 comprises oppositely arranged upper wall portions 32d and 32e including a small angle with the central portion of the wall 32c, said angle being such that the angle included by a side wall 32f and the upper wall portion 32e is equal to the angle included by the arm 26 and the hook part 28 of the yoke part 24. Moreover the yoke part 32 is provided with two substantially U-shaped bridge parts 34.

The feeding device is connected with the feed supply tube 10 by inserting the feed supply tube 10 into the recesses of the walls 24a and 24b (care being taken that the feed supply tube 10 near the cavity in the yoke part 24 is provided at its lower side with an opening), and then the yoke part 32 is placed next to the arms 26 of the yoke part 24 on the feed supply tube 10, said tube 10 then being arranged in the recesses of the walls 32a and 32b of the yoke part 32. Subsequently the yoke part is shifted over the feed supply tube 10 into a position above the yoke part 24, the hook parts 28 of the yoke part 24 then gripping over the upper wall parts 32d and 32e of the yoke part 32 as shown in FIG. 4. By means of the angle between an arm 26 and the corresponding hook part 28 it is effectively prevented that the arms 26 will bend sidewards when, via the yoke part 24, a force is exerted thereon.

FIG. 5 shows a covering cap 36 with an upper side 37 which is designed in the manner usual for the present kind of feeding devices for supporting a wire which should prevent that birds will roost on the feed supply tube 10. The covering cap 36 comprises two oppositely arranged resilient lips 38 which, at their free ends, are each provided with an outwardly extending hook lug 40, which hook lugs 40 are intended to grip behind the central portion of the bridge part 34 of the yoke part 32. In walls 36a and 36b of the covering cap 36 slot parts 39 are formed, each intended for partially enclosing an outwardly extending rib of arms 26.

After arranging the yoke part 32 on the yoke part 24 and enclosing the feed supply tube 10 as shown in FIG. 4, the covering cap 36 is shifted vertically over the yoke part 32 and the arms 26 until the hook lugs 40 of the lips 38 snap behind the bridge parts 34 of the yoke part 32. The situation thus obtained is shown in FIG. 6. The covering cap 36 cannot shift in the longitudinal direction of the feed supply tube 10 by virtue of the coupling between the slot parts 39 and the arms 26. Thereby also the yoke part 32 situated within the covering cap 36 is locked against shifting along the feed supply tube 10.

Figure 8:
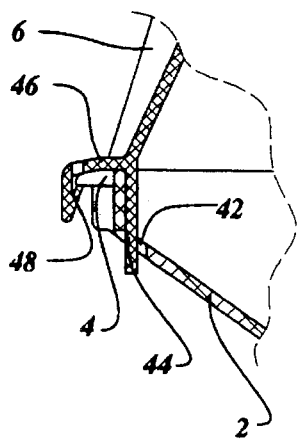
FIG. 8 is a detail at a larger scale at the cut-out VIII according to FIG. 7.
Figure 9:
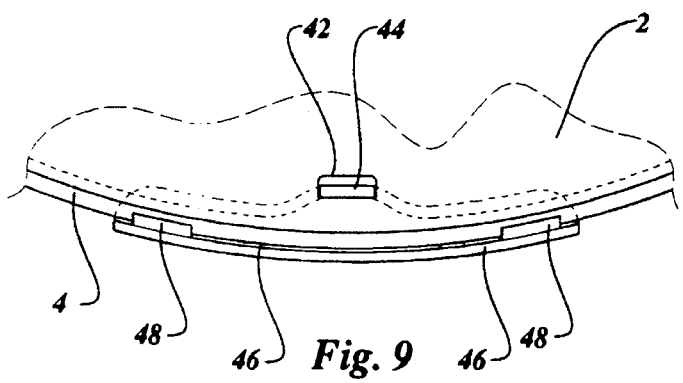
FIG. 9 is a detail at a larger scale seen from below according to the arrow IX of the feeding device of FIG. 7.
Figure 10:
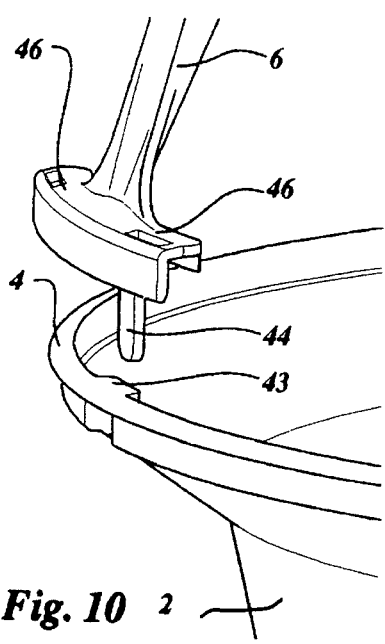
FIG. 10 is a view in perspective of another embodiment of a part of the connecting means according to the invention, before a connection is made.
Figure 11:
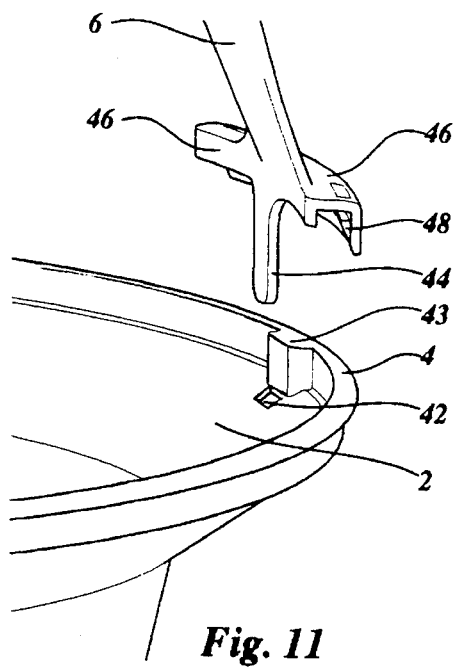
FIG. 11 is a different perspective view of the connecting means of FIG. 10.
Figure 13:
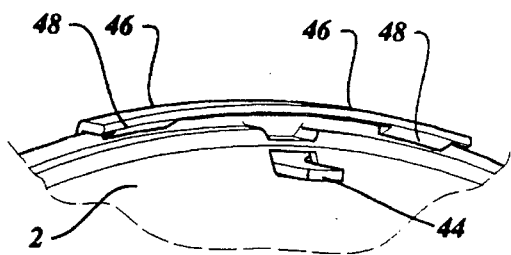
FIG. 13 is a perspective bottom view of the connecting means of FIG. 12.
Figure 12:
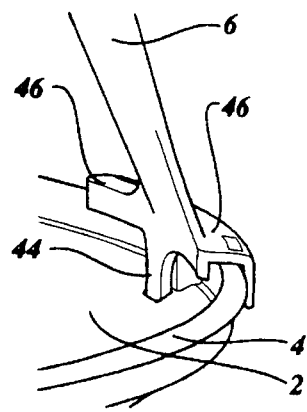
FIG. 12 is perspective view of the connecting means of FIG. 10, after a connection has been made.

FIGS. 8 and 9 show the snap connection between the support arms 6 and the pan 2 at the circumferential rim 4 thereof. The pan 2 is provided with rectangular holes 42, each intended for accommodating a lip 44 connected with an arm 6. Near the circumferential rim 4 of the pan 2 the arms 6 are provided with slightly flexible transverse arms 46, carrying at their free ends hook lugs 48 intended to snap behind the circumferential rim 4. When arranging the body part 8 integrally connected with the arms 6, the feed drop tube 12 and the yoke part 24 on the pan 2, the lips 44, in virtue of their height being larger than that of the transverse arms 46, provide for a first centering of the arms 6 in respect of the pan 2. Subsequently the hook lugs 48 of the transverse arms 46 snap behind the circumferential rim 4 of the pan 2, so that a very strong connection with the circumferential rim 4 will be obtained, which can be exclusively released by releasing the hook lugs 48 one by one, which is impossible for the birds.

FIGS. 10–14 show a pan 2 having for each arm 6 a hole 42 next to a radially inward directed support projection 43. The design of the arms 46, the hook lugs 48 and the supporting lip 44 are generally the same as shown in FIGS. 1 and 7–9.

Figure 14:
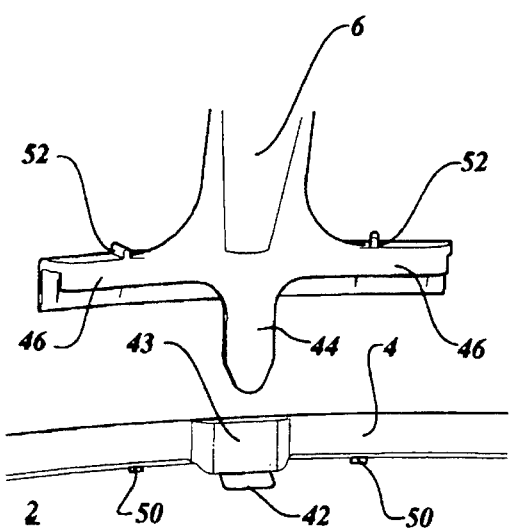
FIG. 14 is a perspective view of a modified embodiment of the connecting means of FIG. 10, before a connection is made.

Referring to FIG. 14, the pan 2 is additionally provided with two holes 50 on either side of the support projection 43. The transverse arms 46 are provided with projections 52, whereas the supporting lip 44 is substantially thinner than the supporting lips 44 of the other arms, allowing the supporting lip 44 of FIG. 14 to bend easily. In the arrangement of FIG. 14, after a connection has been made, strips can be loosely laced through the holes 50 and around the corresponding arm 46, and closed. In this easy way a hinge connection between a support arm 6 and the pan 2 is provided, when the other arms are not connected to the pan. Accordingly, the pan 2 can be pivoted away from the rest of the feeding device, and the feeding device can be cleaned easily without removing it from the feed supply system. The flexibility of the supporting lip 44 ensures that during the pivoting the lip will not break off.

While the invention has been described and illustrated in its preferred embodiments, it should be understood that departures may be made therefrom within the scope of the invention, which is not limited to the details disclosed herein.

What is claimed is:

1. A feeding device for poultry for use with a feed supply system having a horizontal feed supply tube, in particular for turkeys, comprising:

a substantially dish-shaped pan having a rim;

a feed drop tube arranged centrally above the pan and having a vertically directed centre line, the upper end of the feed drop tube being adapted to be in open connection with the horizontal feed supply tube of the feed supply system, and the lower end thereof being open and extending above the pan; and connecting means for connecting the pan with the feed supply tube, which connecting means comprise support arms extending to the pan, wherein the support arms, at their ends directed towards the pan, are each provided with two transverse arms extending in opposite directions, the transverse arms being provided with hook lugs for gripping around the rim of the pan at one side of the pan;

at least one supporting lip for bearing against the pan, said at least one supporting lip carried on a member selected from the group consisting of said support arms and said transverse arms.

2. A feeding device according to claim 1, wherein the hook lugs are situated at an outside portion of the pan.

3. A feeding device according to claim 1, wherein at least one supporting lip extends through a hole in the pan.

4. A feeding device according to claim 3, wherein said at least one supporting lip is flexible and can be bent in a direction at right angles to the pan.

5. A feeding device according to claim 1, wherein the pan in the area of at least one transverse arm is provided with a hole.

6. A feeding device according to claim 5, wherein the transverse arm in the area next to the hole and facing away from the corresponding support arm and from the pan is provided with a projection.

7. A feeding device according to claim 1, the connecting means comprising:

a first yoke part having, at one side, a shape which is adapted to the shape of the feed supply tube, and having two yoke arms extending on opposite sides of the feed supply tube and substantially perpendicularly thereto, which yoke arms, at their free ends, are provided with hook parts directed towards each other; and a second yoke part having, at one side, a shape which is adapted to the shape of the feed supply tube, the hook parts of the first yoke part being adapted to grip behind one side of the second yoke part remote from the feed supply tube when the feed supply tube is inserted between both yoke parts.

8. A feeding device according to claim 7, wherein the first yoke part forms a part of the feed supply device, and the second yoke part is a separate element.

9. A feeding device according to claim 7, wherein the yoke arms of the first yoke part are substantially parallel to each other.

10. A feeding device according to claim 7, wherein each yoke arm and the associated hook part include an angle which is smaller than 90°.

11. A feeding device according to claim 1, manufactured completely of plastics.

* * * * *